(12) United States Patent
Wang

(10) Patent No.: US 7,352,364 B2
(45) Date of Patent: Apr. 1, 2008

(54) METHOD FOR TOGGLING BETWEEN TOUCH CONTROL OPERATION MODES

(75) Inventor: Jen Chun Wang, Taipei (TW)

(73) Assignee: Compal Electronics, Inc., Taipei (TW)

( * ) Notice: Subject to any disclaimer, the term of this patent is extended or adjusted under 35 U.S.C. 154(b) by 729 days.

(21) Appl. No.: 10/850,779

(22) Filed: May 21, 2004

(65) Prior Publication Data

US 2004/0239646 A1     Dec. 2, 2004

(30) Foreign Application Priority Data

May 28, 2003 (TW) ............................... 92114352 A

(51) Int. Cl.
*G09G 5/00* (2006.01)
(52) U.S. Cl. .................. 345/173; 345/174; 345/178; 178/18; 178/19
(58) Field of Classification Search ............... 348/173, 348/174, 178; 178/18, 19
See application file for complete search history.

(56) References Cited

U.S. PATENT DOCUMENTS 5,376,946 A * 12/1994 Mikan ...................... 345/157

* cited by examiner

*Primary Examiner*—Richard Hjerpe
*Assistant Examiner*—Leonid Shapiro
(74) *Attorney, Agent, or Firm*—Han-Yi Lee; Bayshore Patent Group LLC

(57) ABSTRACT

This invention relates to a method for toggling between operation modes of a touch control device, being applied in an electronic data processing device with a touch control device and providing an electronic data processing device capable of toggling its operation between a first coordinate operation mode and a second coordinate operation mode to use the input of the touch control device, which comprises the steps of: setting a predetermined area of a touch control device as a switching mode area by a controller; determining a received position signal by the controller whether or not to act as an instruction for toggling its operation between the first coordinate operation mode and the second coordinate operation; and setting the current operation mode to another operation mode by the controller if the determination is true.

14 Claims, 5 Drawing Sheets

METHOD FOR TOGGLING BETWEEN TOUCH CONTROL OPERATION MODES

FIELD OF THE INVENTION

The present invention relates to a method of controlling a touch control device, more particularly to a method of toggling between a first coordinate operation mode and a second coordinate operation mode by operating a touch control device.

BACKGROUND OF THE INVENTION

Please refer to FIG. 5 for the view of a prior-art touch control device. When a user operates a prior-art touch control device 50 and requires toggling its operation between an absolute coordinate operation mode and a relative coordinate operation mode, the user has to press a switch 50A to toggle between the operation modes. Such arrangement is obviously inconvenient to a user to operate a touch control device when the user executes an application program, and thus constitutes a hindrance to the smooth application of the human-machine interface.

The U.S. Pat. No. 6,061,051 entitled "Command set for touchpad pen-input mouse" disclosed a technical method of toggling between an absolute coordinate mode and a relative coordinate mode. However, the toggle is fully determined and decided by a computer system such as a notebook computer, and sends additional instructions given by a computer system to a touch pad to complete the toggling action. However, such prior art requires additional instructions, and it is a big issue whether or not such additional instructions are extensively compatible to the touch control device.

In view of the shortcomings of the prior art, the inventor of the present invention based on years of experience in the related industry to overcome the shortcomings of the prior art, and invented a method for users to frequently repeat toggling between an absolute coordinate operation mode and a relative coordinate operation mode, and completely use a quick and simple method for toggling between these two operation modes.

SUMMARY OF THE INVENTION

The primary objective of the present invention is to provide a quick and simple method of toggling between a first coordinate operation mode and a second coordinate operation mode of a touch control device.

Another objective of the present invention is to provide a touch control device capable of independently determining and executing the toggle between a first coordinate mode and a second coordinate mode of a touch control device.

To achieve the foregoing objectives, the present invention provides a method of toggling between operation modes of a touch control device, being applied in an electronic data processing device with a touch control device and providing a toggle between a first coordinate operation mode and a second coordinate operation mode to use the input device of the touch control device, which comprises the steps of: setting a predetermined area of a touch control device as a switching mode area by a controller; determining a received position signal by the controller whether or not to act as an instruction for toggling between the first coordinate operation mode and the second coordinate operation; and setting the current operation mode to another operation mode by the controller if the determination is true.

Further, the present invention provides an electronic data processing device, wherein the electronic data processing device can be toggled between a first coordinate operation mode and a second coordinate operation mode to use the input device of the touch control device which comprises: a touch control device having a controller, wherein the touch control device is used for executing the procedures of: setting a predetermined area of a controller of a touch control device as a switching mode area; determining a received position signal by the controller whether or not to act as an instruction for toggling between the first coordinate operation mode and the second coordinate operation; and setting the current operation mode to another operation mode by the controller if the determination is true.

DETAILED DESCRIPTION OF THE INVENTION

The detailed description and technical characteristics of the present invention are described together with the drawings as follows.

Figure 1:
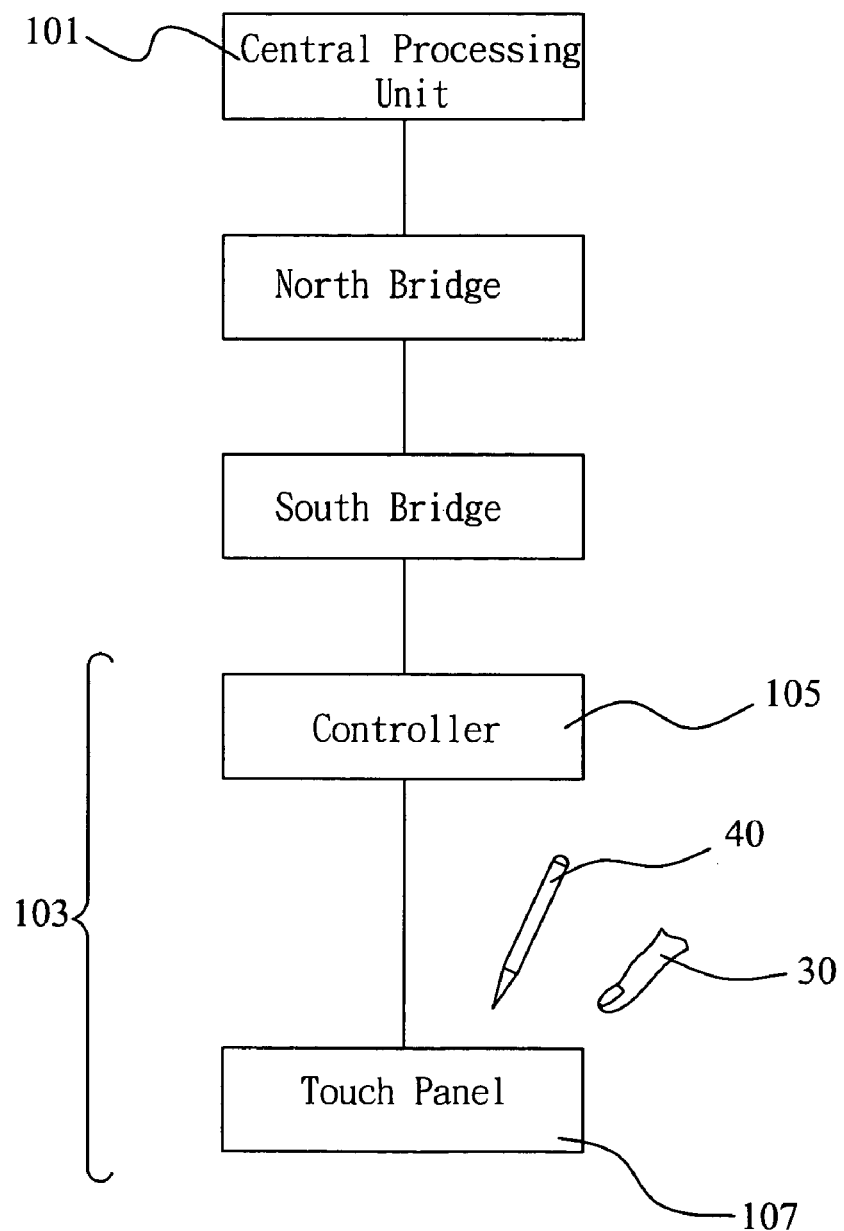
FIG. 1 is a view of the structure of the electronic data processing device to implement the method according to a preferred embodiment of the present invention.

Please refer to FIG. 1 for the view of a structure of an electronic data processing device according to the method of the present invention. In general, a touch control device 103 converts an analog signal produced by using a finger 30 or a pen 40 to gently touch a touch panel 107 into a digital signal, and sends such digital signal to a central processing unit 101 of an electronic data processing device 10 to carry out the next processing step, and this digital signal is divided into a digital signal with a first coordinate operation mode and a digital signal with a second coordinate operation mode. In general, the first coordinate operation mode is embodied to an absolute coordinate operation mode. The absolute coordinate operation mode is used for inputting handwritten text, or collocated with an application program that uses an absolute coordinate for the input as needed. The second coordinate operation mode is embodied to the relative coordinate operation mode. The relative coordinate operation mode mainly provides a cursor function similar to that of a mouse. In an electronic data processing device 10 of a Window operating system platform usually executes several application programs at the same time, it is necessary for users to toggle between the first coordinate operation mode and the second coordinate operation mode frequently to meet the input requirements of the touch control device 103 of these application programs. The present invention can toggle between these two operation modes in a simple and quick manner.

Figure 2:
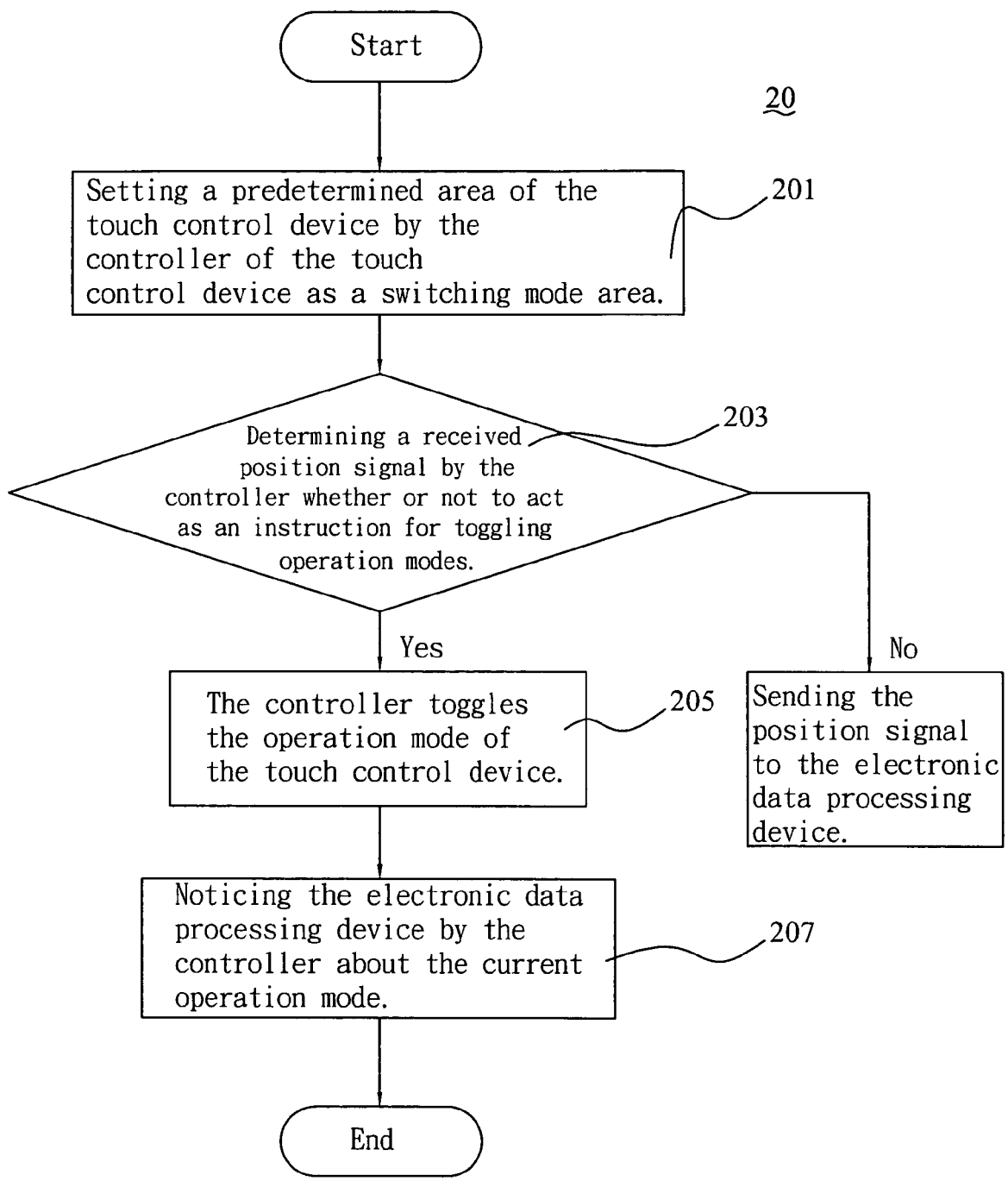
FIG. 2 is a flow chart according to the present invention.

Please refer to FIG. 2 for the flow chart of the method according to the present invention. The method 20 of toggling between the operation modes of a touch control device is applied in an electronic data processing device 10 as shown in FIG. 1 to toggle the electronic data processing device 10 between the first coordinate operation mode and the second coordinate operation mode, and let users toggle between these operation modes and use the input device of the touch control device 103. The toggling method 20 comprises the following steps.

Figure 3:
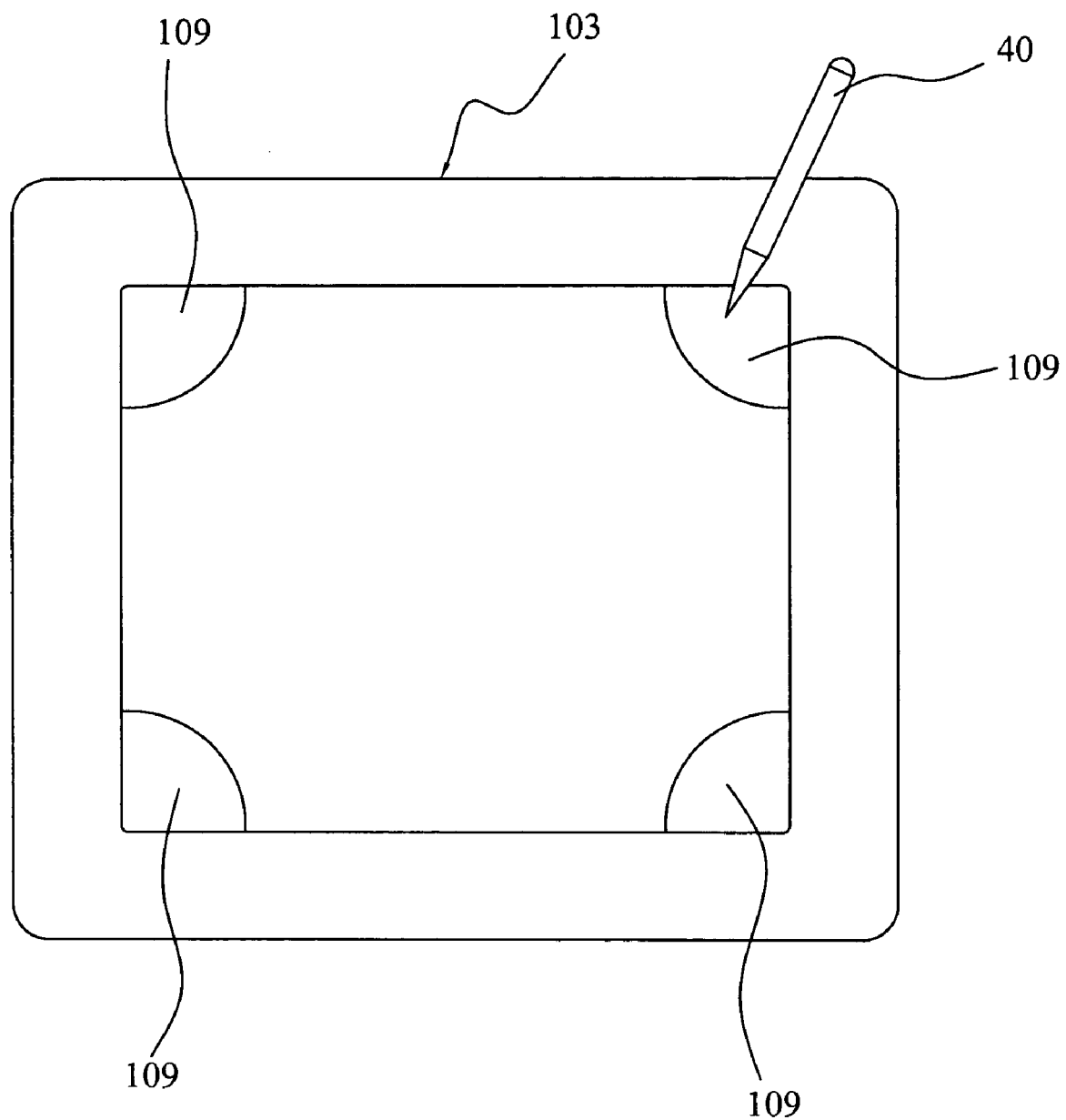
FIG. 3 is a view of the switching mode area of the touch control device according to the present invention.

Step (201) is to set a predetermined area of the touch control device 103 by the controller 105 of the touch control device 103 as a switching mode area 109. Please refer to FIG. 3 for an illustrative view of the switching mode area 109 of the touch control device, wherein the switching mode area 109 is an independent area or comprised of at least one area. The switching mode area 109 is a user-defined area for users to define the switching mode area 109 to the touch control device 103 according to the user's using habits.

Figure 4A:
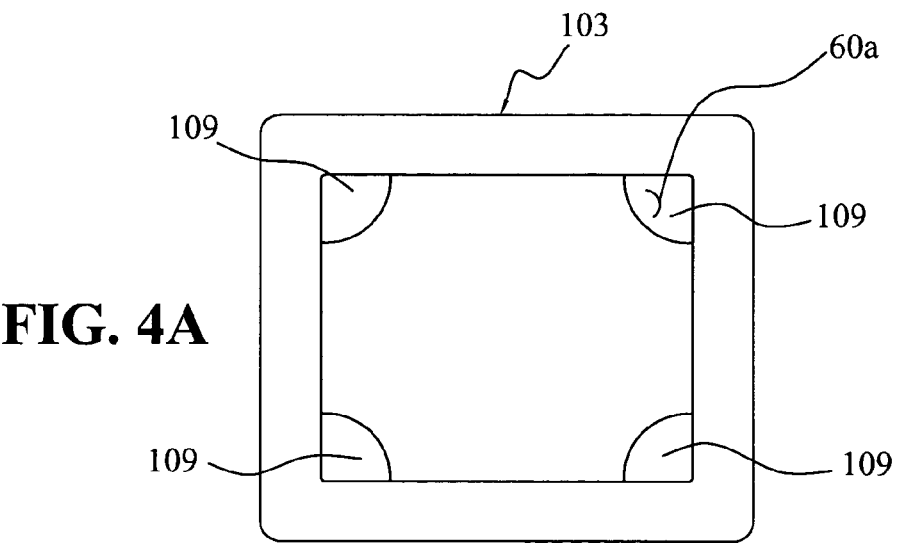
FIGS. 4A and 4C are views of the mode of the position signal of the touch control device according to the present invention.
Figure 4B:
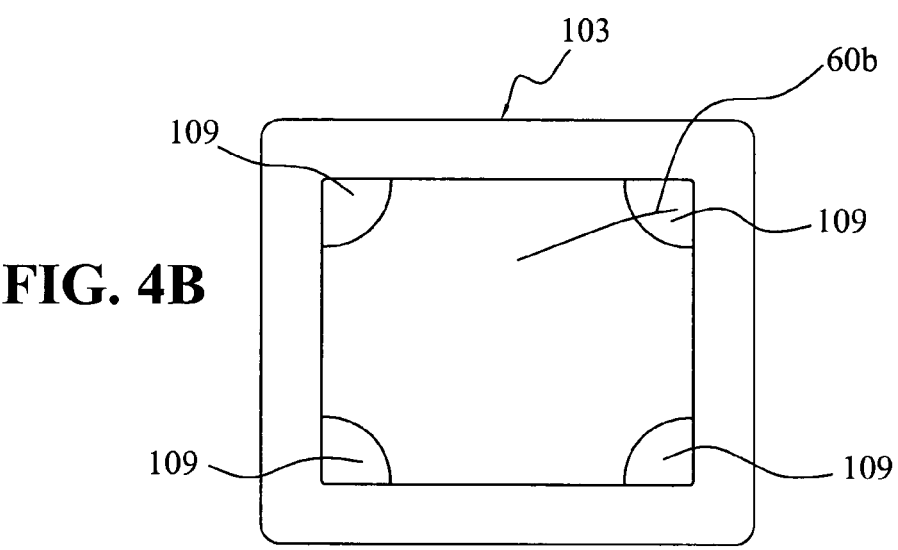
Figure 4C:
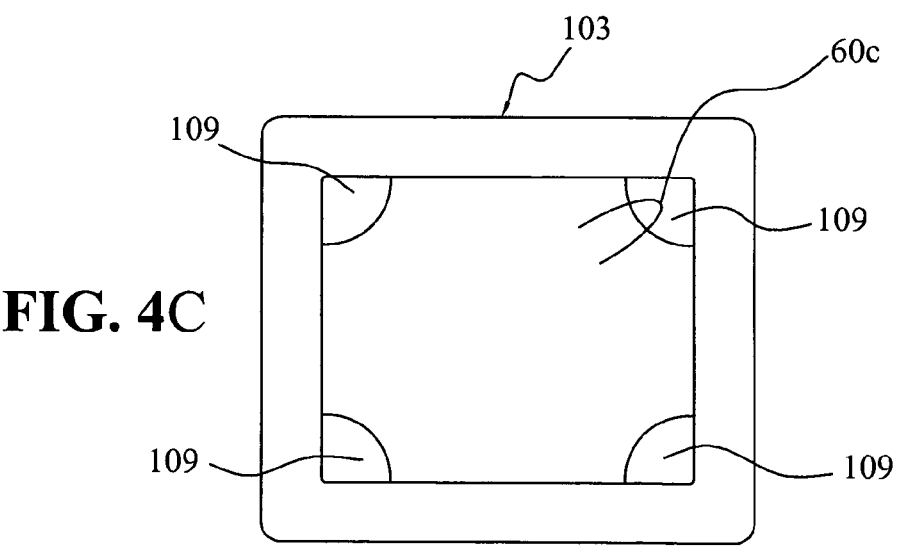
Figure 5:
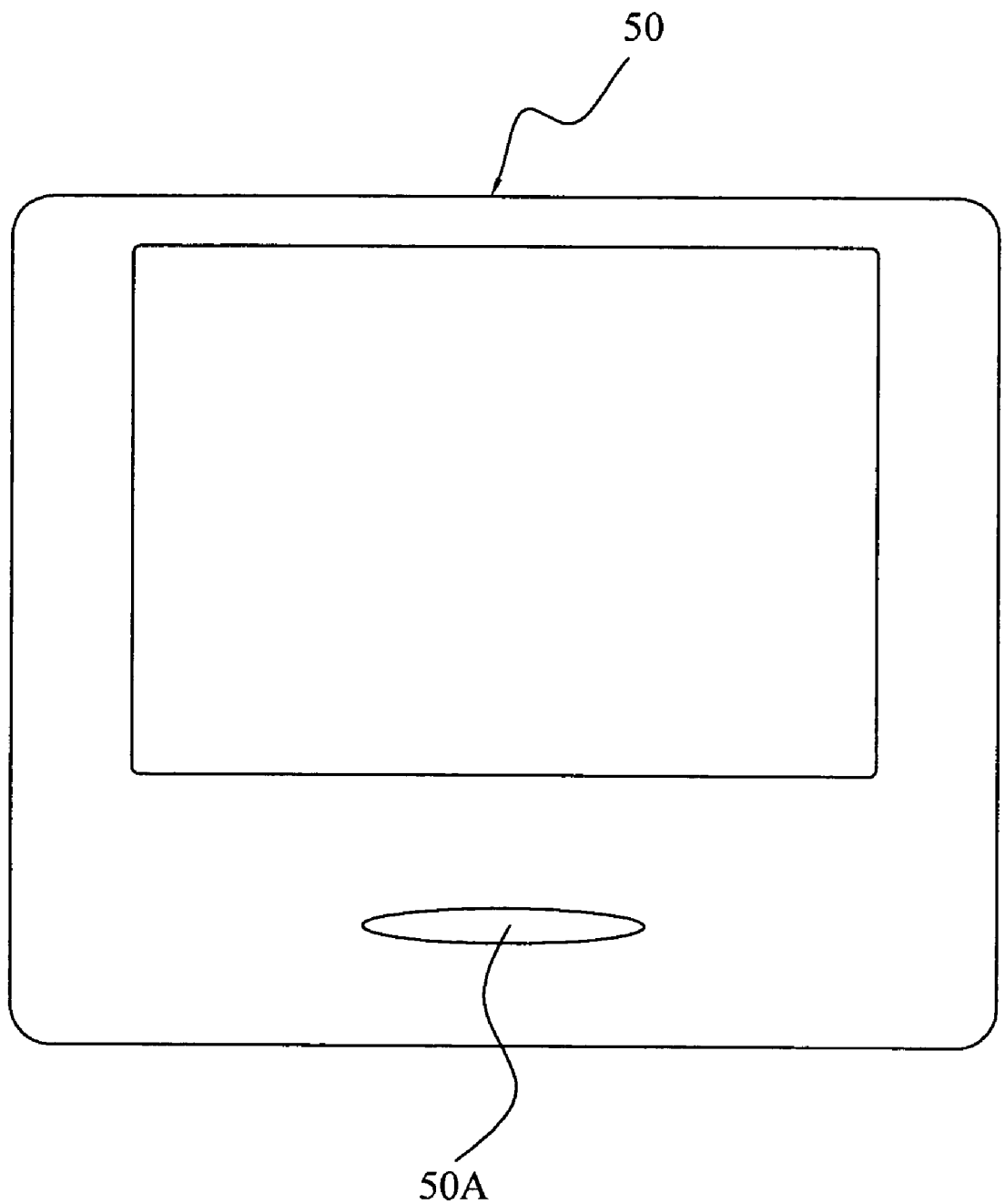
FIG. 5 is a view of a prior-art touch control device.

Step (203) is to determine a received position signal by a controller 105 whether to serve as an instruction for the first coordinate operation mode or the second coordinate operation mode, and such controller 105 receives a position signal produced by gently touching the touch control device 103 by a finger 30 or a handwriting pen 40, and the controller 105 uses the received position signal to determine whether or not to act as the instruction for toggling between the first coordinate operation mode and the second coordinate operation mode. Please refer to FIGS. 4A to 4C for the position signal modes of the touch control device. In FIG. 4A, the controller 105 starts receiving position signals until all positional signals are received, which is represented by a track 60a, and the track 60a is located in the switching mode areas 109. Therefore, the controller 105 determines as the instruction given to the touch control device 103 to toggle the operation modes by a user's finger 30 or a handwriting pen 40. The controller 105 as shown in FIGS. 4B and 4C starts receiving the position signal until all position signals are received, which are respectively represented by tracks 60b, 60c. In tracks 60b, 60c, there is at least one position signal not located in the switching mode area 109. The controller 105 in the tracks 60b, 60c of such condition considers that a user performs a regular operation to the touch control device 103 instead of giving instructions for toggling between operation modes. Therefore, the controller 105 will directly send the position signal of the tracks 60b, 60c to the electronic data processing device 10. In Step (203) according to the present invention, the foregoing controller 105 determines the tracks 60a, 60b, 60c of the controller 105 by confirming the normal operation of toggling the operation modes in order to prevent any toggle by mistake.

Step (205) is to set the current operation mode to another operation mode by the controller 105 when the Step (203) is determined to be true. In other words, the touch control device 103 toggles between the absolute coordinate operation modes and the relative operation mode.

Step (207) is to notice the electronic data processing device 10 by the controller 105 about the current operation mode of the touch control device 103, primarily for letting the electronic data processing device 10 immediately know what kind of operation mode of the next input from the touch control device 103, so that the central processing unit 101 can process the input of the touch control device 103 under such required operation mode.

The method according to the present invention is executed mainly by the controller 105, which can be achieved completely by a firmware, and implemented by drafting program codes. Then the controller 105 can execute such program codes directly.

Since the method of toggling the operation modes according to the present invention is carried out independently by the touch control device 103 without making a big change to other program drivers of the electronic data processing device 10 or the hardware architecture, all these are the major features of the present invention.

The touch control device 103 according to the embodiments of the present invention could be a touch pad or any other similar input device.

The electronic data processing device 10 according to the embodiments of the present invention could be a notebook computer or any other similar electronic devices.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for toggling between touch control operation modes, being applied in an electronic data processing device with a touch control device and providing a switch of its operation between a first coordinate operation mode and a second coordinate operation mode to input by using said touch control device, and said method comprising the steps of:
   (A) setting a predetermine area of said touch control device y a controller of said touch control device as a switching mode area;
   (B) determining by said controller whether or not a received position signal to act as an instruction for toggling between said first coordinate operation mode and said second coordinate operation mode, wherein said controller determines a received position signal until all position signals are received, if at least one among said all position signals is not located in said switching mode area, said determination step is set as false, and said determination is used to confirm a normal operation of said switching operation mode and prevent toggling said operation modes by mistake; and
   (C) setting the current operation mode to another operation mode by said touch control device, if Step (B) is determined as true.

2. The method for toggling between touch control operation modes of claim 1, wherein said Step (B) determines a received position signal by said controller until all position signals are received; if said all position signals are located in said switching mode area, then said determination step is set as true, and said determination step is used to confirm a normal operation of said switching operation mode and prevent toggling said operation modes by mistake.

3. The method for toggling between touch control operation modes of claim 1, wherein said predetermined area is a user-defined area.

4. The method for toggling between touch control operation modes of claim 1, wherein said electronic data processing deice is a notebook computer.

5. The method for toggling between touch control operation modes of claim further comprising the step of:
   (D) noticing said electronic processing data processing device by said controller about the current operation mode of said touch control device.

6. The method for toggling between touch control operation modes of claim 1, wherein said first coordinate operation mode is an absolute coordinate operation mode.

7. The method for toggling between touch control operation modes of claim 1, wherein said second coordinate operation mode is a relative coordinate operation mode.

8. An electronic data processing device, capable of being toggled between a first coordinate operation mode and a second coordinate operation mode and using a touch control device for input, comprising a touch control device with a controller, wherein said electronic data processing device comprising:

means for setting a predetermined area of said touch control device by said controller of said touch control device as a switching mode area;

means for determining a received position signal by said controller whether to act as an instruction for toggling between said absolute coordinate operation mode and said relative coordinate operation mode; if said determination step is true, then the current operation mode is set to another operation mode;

means for determining a received position signal by said controller until all position signals are received, if at least one among all said position signals is not located in said switching mode area, said determination step is set as false, and said determination step is used to confirm a normal operation of said switching operation mode and prevent toggling said operation modes by mistake, and a central processing unit for processing an input selectively under said first coordinate operation mode and said second coordinate operation mode.

9. The electronic data processing device for claim 8, further comprising:

means for determining a received position signal by said controller until all position signals are received; if said all position signals are located in said switching mode area, then said determination is set as true and said determination step is used to confirm a normal operation of said switching operation mode and prevent toggling said operation modes by mistake.

10. The electronic data processing device of claim 8, wherein said predetermine area is a user-defined area.

11. The electronic data processing device of claim 8, wherein said electronic data processing device is a notebook computer.

12. The electronic data processing device of claim 8, further comprising:

means for noticing said central processing unit about the current operation mode of said touch control device.

13. The electronic data processing device of claim 8, wherein said first coordinate operation mode is an absolute coordinate operation mode.

14. The electronic data processing device of claim 8, wherein said second coordinate operation mode is a relative coordinate operation mode.

* * * * *